United States Patent
Hsueh

(10) Patent No.: US 8,347,113 B2
(45) Date of Patent: Jan. 1, 2013

(54) SYSTEM AND METHOD FOR ENCRYPTING AN ELECTRONIC FILE IN A MOBILE ELECTRONIC DEVICE

(75) Inventor: Ching-Wen Hsueh, Tu-Cheng (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 729 days.

(21) Appl. No.: 12/503,660

(22) Filed: Jul. 15, 2009

(65) Prior Publication Data

US 2010/0058071 A1 Mar. 4, 2010

(30) Foreign Application Priority Data

Aug. 28, 2008 (CN) .......................... 2008 1 0304266

(51) Int. Cl.
  *G06F 12/14* (2006.01)
(52) U.S. Cl. ............. 713/189; 713/193; 380/28; 380/42
(58) Field of Classification Search .................. 713/189, 713/193; 380/28, 42
  See application file for complete search history.

(56) References Cited

U.S. PATENT DOCUMENTS

| | | | | |
|---|---|---|---|---|
| 4,238,854 A | * | 12/1980 | Ehrsam et al. ................. | 713/165 |
| 4,691,352 A | * | 9/1987 | Arragon et al. ............... | 380/215 |
| 5,365,589 A | * | 11/1994 | Gutowitz ....................... | 380/43 |
| 6,792,108 B1 | * | 9/2004 | Patera et al. ................... | 380/43 |
| 6,996,234 B2 | * | 2/2006 | Henson et al. ................. | 380/42 |
| 7,016,493 B2 | * | 3/2006 | Henson et al. ................. | 380/44 |
| 7,406,174 B2 | * | 7/2008 | Palmer ............................ | 380/28 |
| 2003/0005321 A1 | * | 1/2003 | Fujioka ......................... | 713/193 |
| 2004/0062389 A1 | * | 4/2004 | Etienne et al. ................. | 380/28 |
| 2006/0075260 A1 | * | 4/2006 | Tucker et al. ................. | 713/190 |
| 2008/0292097 A1 | * | 11/2008 | Lin ................................. | 380/28 |
| 2009/0092251 A1 | * | 4/2009 | Domosi ......................... | 380/255 |
| 2010/0111293 A1 | * | 5/2010 | Frenkel et al. ................. | 380/28 |

OTHER PUBLICATIONS

Maxwell Anderson. "Dynex Internal All in 1 Card Reader Review" Published Nov. 1, 2006 (4 pages) http://www.reviewdesk.com/dynex-card-reader/.*
Douglas Dedo. "Windows Mobile-Based Devices and Security: Protecting Sensitive Business Information" © 2004 Microsoft Corp. (pp. 1-33).*

* cited by examiner

*Primary Examiner* — Edward Zee
*Assistant Examiner* — Thomas Gyorfi
(74) *Attorney, Agent, or Firm* — Altis Law Group, Inc.

(57) ABSTRACT

A system and method for encrypting an electronic file in a mobile electronic device reads bytes of the electronic file from a cache of a memory system and divides the bytes into a plurality of byte lines. The system and method further assigns a numerical cipher to each byte line and searches a position of each numerical cipher in a corresponding byte line. Furthermore, the system and method encrypt each byte line by inserting one or more random bytes into each byte line, and generates an encrypted electronic file by combining all the encrypted byte lines.

17 Claims, 6 Drawing Sheets

| Position | 0 | 1 | 2 | 3 | 4 | 5 | 6 | 7 | 8 | 9 | Numerical Ciphers |
|---|---|---|---|---|---|---|---|---|---|---|---|
| Byte | 89 | 50 | 4E | 47 | 0D | 0A | 1A | 0A | 00 | 00 | 6 |
| | 00 | 00 | 00 | 28 | 00 | 00 | 00 | 20 | 08 | 06 | 5 |
| | 00 | 00 | 00 | 00 | 04 | 67 | 41 | 4D | 41 | 00 | 0 |
| | E9 | 00 | 00 | 00 | 19 | 74 | 45 | 58 | 74 | 53 | 2 |
| | 65 | 00 | 41 | 64 | 6F | 62 | 65 | 20 | 87 | 68 | 1 |
| | 64 | 79 | 71 | C9 | 65 | 3C | 00 | 00 | 07 | 68 | 8 |
| | EC | 58 | 4B | 68 | 5C | D7 | 19 | FE | EE | BC | 6 |
| | 92 | 2C | A5 | B2 | 8D | 69 | 70 | 6C | 23 | 1B | 5 |
| | 8B | B4 | 21 | 26 | 24 | 6E | A9 | 0D | 1C | AD | 0 |
| | 4B | A1 | 85 | 6E | DA | 42 | 17 | A6 | 8F | 4D | 2 |
| | A1 | C5 | 0B | 43 | 6B | 50 | 9D | 20 | CB | 51 | 1 |
| | F5 | 1A | 49 | 33 | 9A | D1 | BC | 34 | EF | 87 | 8 |

FIG. 4

| Position | 0 | 1 | 2 | 3 | 4 | 5 | 6 | 7 | 8 | 9 | Numerical Ciphers |
|---|---|---|---|---|---|---|---|---|---|---|---|
| Byte | 89 | 50 | 4E | 47 | 0D | 0A | 1A | 0A | 00 | 00 | 6 |

| Position | 0 | 1 | 2 | 3 | 4 | 5 | 6 | 7 | 8 | 9 | 10 | 11 | Numerical Ciphers |
|---|---|---|---|---|---|---|---|---|---|---|---|---|---|
| Byte | 89 | 50 | 4E | 47 | 0D | 0A | 1A | *12* | *34* | 0A | 00 | 00 | 6 |

| Position | 0 | 1 | 2 | 3 | 4 | 5 | 6 | 7 | 8 | 9 | 10 | 11 | Numerical Ciphers |
|---|---|---|---|---|---|---|---|---|---|---|---|---|---|
| Byte | 89 | 50 | 4E | 47 | 0D | 0A | 1A | *12* | *34* | 0A | 00 | 00 | 6 |
| | 00 | 00 | 00 | 28 | 00 | 00 | *56* | *78* | 00 | 20 | 08 | 06 | 5 |
| | 00 | *90* | *AB* | 00 | 00 | 00 | 04 | 67 | 41 | 4D | 41 | 00 | 0 |
| | E9 | 00 | 00 | *CD* | *EF* | 00 | 19 | 74 | 45 | 58 | 74 | 53 | 2 |
| | 65 | 00 | *21* | *43* | 41 | 64 | 6F | 62 | 65 | 20 | 87 | 68 | 1 |
| | 64 | 79 | 71 | C9 | 65 | 3C | 00 | 00 | 07 | *65* | *87* | 68 | 8 |
| | EC | 58 | 4B | 68 | 5C | D7 | 19 | *A0* | *CB* | FE | EE | BC | 6 |
| | 92 | 2C | A5 | B2 | 8D | 69 | *FE* | *F8* | 70 | 6C | 23 | 1B | 5 |
| | 8B | *00* | *56* | B4 | 21 | 26 | 24 | 6E | A9 | 0D | 1C | AD | 0 |
| | 4B | A1 | 85 | *A2* | *D7* | 6E | DA | 42 | 17 | A6 | 8F | 4D | 2 |
| | A1 | C5 | *64* | *52* | 0B | 43 | 6B | 50 | 9D | 20 | CB | 51 | 1 |
| | F5 | 1A | 49 | 33 | 9A | D1 | BC | 34 | EF | *94* | *81* | 87 | 8 |

FIG. 6

SYSTEM AND METHOD FOR ENCRYPTING AN ELECTRONIC FILE IN A MOBILE ELECTRONIC DEVICE

BACKGROUND

1. Technical Field

Embodiments of the present disclosure are related to encryption, and particularly to a system and method for encrypting an electronic file in a mobile electronic device.

2. Description of Related Art

It is very important to keep private information safe and secure. One method for ensuring information security of a mobile electronic device is to set a password by a user. The user starts the mobile electronic device by inputting the password. However, the password for the mobile electronic device may be easily cracked, so that the information in the mobile electronic device may be viewed by others.

Therefore, there is a need for a system and method to overcome the aforementioned problem.

BRIEF DESCRIPTION OF THE DRAWINGS

FIG. 4 illustrates one embodiment of the byte lines of the electronic file before encryption.

FIG. 6 illustrates one embodiment of the byte lines of an encrypted electronic file.

DETAILED DESCRIPTION

All of the processes described below may be embodied in, and fully automated via, function modules executed by one or more general purpose processors of a mobile electronic device. Some or all of the methods may alternatively be embodied in specialized hardware. The function modules may be stored in any type of computer-readable medium or other computer storage device.

Figure 1:
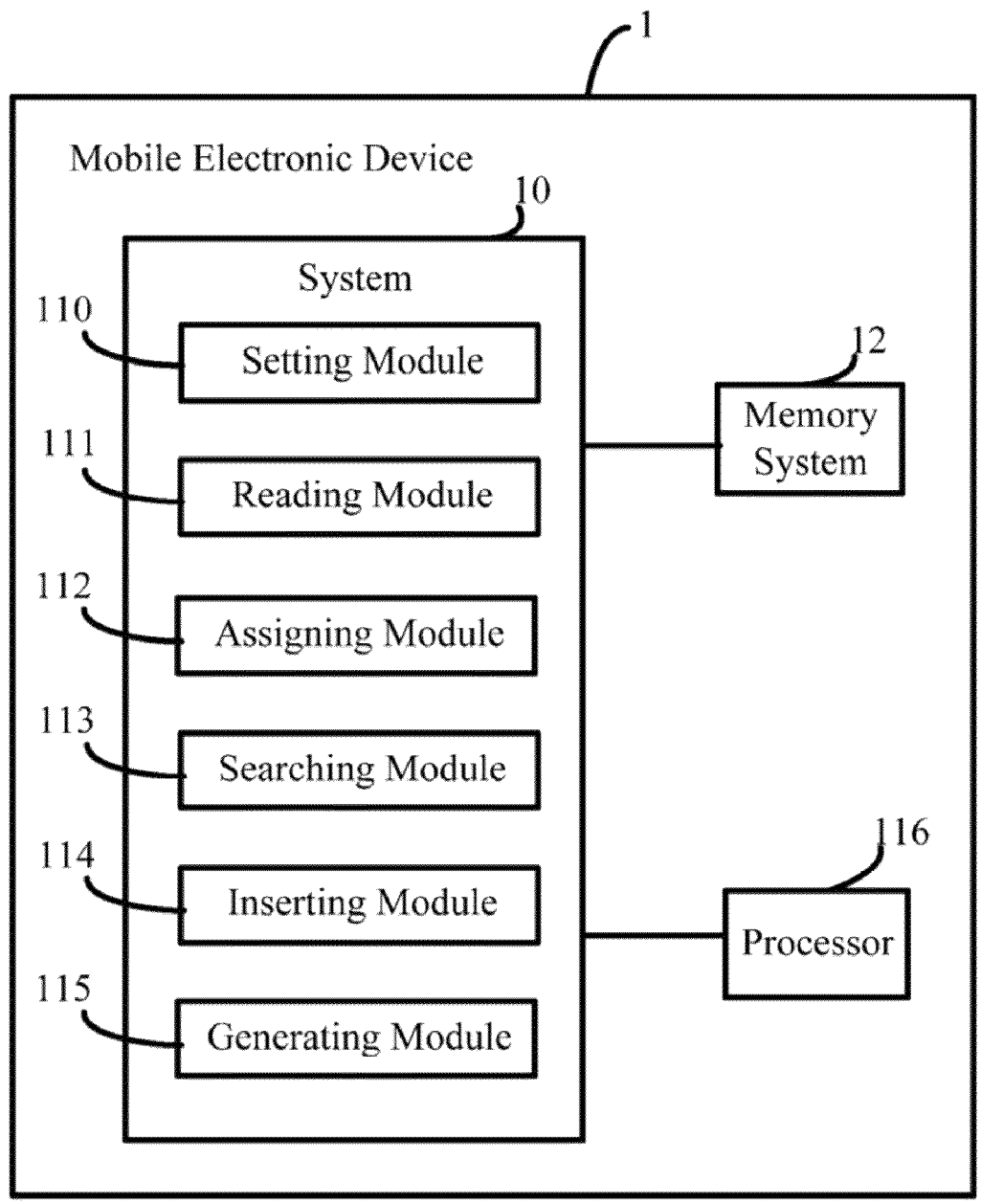
FIG. 1 is a block diagram of one embodiment of a mobile electronic device 1 comprising a system for encrypting an electronic file.

FIG. 1 is a block diagram of one embodiment of a mobile electronic device 1 comprising a system 10. The system 10 may be used to encrypt electronic files. In one embodiment, the mobile electronic device 1 includes a memory system 12.

The memory system 12 pre-stores an electronic file. In one embodiment, the electronic file may be a text file, an image file, or a multimedia file, for example. The memory system 12 may be an internal memory system card or an external memory system card, such as a smart media card (SMC), a secure digital card (SDC), a compact flash card (CFC), a multi media card (MMC), a memory system stick (MS), an extreme digital card (XDC), or a trans flash card (TFC). The memory system 12 may also be a random access memory (RAM), or a read only memory (ROM). Depending on the embodiment, the mobile electronic device 1 may be a mobile phone, a personal digital assistant (PDA), a handheld game player, a digital camera, or any other portable electronic device.

In one embodiment, the system 10 includes a capturing module 110, a reading module 111, an assigning module 112, a searching module 113, an inserting module 114, and a generating module 115. One or more computerized codes of the modules 110-115 are stored in the memory system 12. One or more general purpose or specialized processors, such as a processor 116 executes the one or more computerized codes of the modules 110-115 to provide one or more operations of the mobile electronic device 1.

The setting module 110 sets numerical ciphers for the electronic file. In one embodiment, the user may press one or more buttons on the mobile electronic device 1 to set numerical ciphers for the electronic file. In another embodiment, the mobile electronic device 1 may comprise a touch panel to receive user input. For example, the user may set numerical ciphers "650218" for the electronic file. The number "6" is a numerical cipher.

The reading module 111 reads bytes of the electronic file from a cache of the memory system 12 and divides the bytes into a plurality of byte lines as shown in FIG. 4. Each byte line comprises one or more bytes. For example, each byte line may comprise ten bytes. Depending on this embodiment, each byte may be represented by a binary value, a decimal value, or a hexadecimal value. In one exemplary embodiment, each byte may be represented by a hexadecimal value. For example, the hexadecimal value "89" represents a byte in the first byte line in FIG. 4. In one embodiment, the cache of the memory system 12 may reside in the random access memory (RAM) of the memory system 12, or the read only memory (ROM) of the memory system 12, for example.

The assigning module 112 assigns a numerical cipher to each byte line in a cyclical manner. In one embodiment, as shown in FIG. 4, the assigning module 112 assigns a numerical cipher "6" to a first byte line, a numerical cipher "5" to a second byte line, a numerical cipher "0" to a third byte line, a numerical cipher "2" to a fourth byte line, a numerical cipher "1" to a fifth byte line, and a numerical cipher "8" to a sixth byte line. Then the assigning module 112 assigns the numerical ciphers "6," "5," "0," "2," "1," and "8" to consecutive byte lines repetitiously.

The searching module 113 searches a position of each numerical cipher in a corresponding byte line. In one embodiment, as shown in FIG. 4, the numerical cipher corresponding to the first byte line is "6," then the position of numerical cipher in first byte line is "6," for example.

Figure 5:
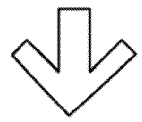
FIG. 5 illustrates one embodiment of a process of encrypting a byte line.

The inserting module 114 inserts one or more random bytes into each byte line according to the searched position, so as to encrypt each byte line. A detailed description is as follows (the following description uses first byte line for example). In one embodiment, as shown in FIG. 5, the inserting module 114 inserts two random bytes "12" and "34" into the first byte line after the byte "1A" to encrypt the first byte line, then the first byte line comprises twelve bytes. Additionally, the random bytes are generated by a random function.

The generating module 115 generates an encrypted electronic file by combining all the encrypted byte lines. In one embodiment, as shown in FIG. 5, the encrypted electronic file is generated by combining all the encrypted byte lines.

Figure 2:
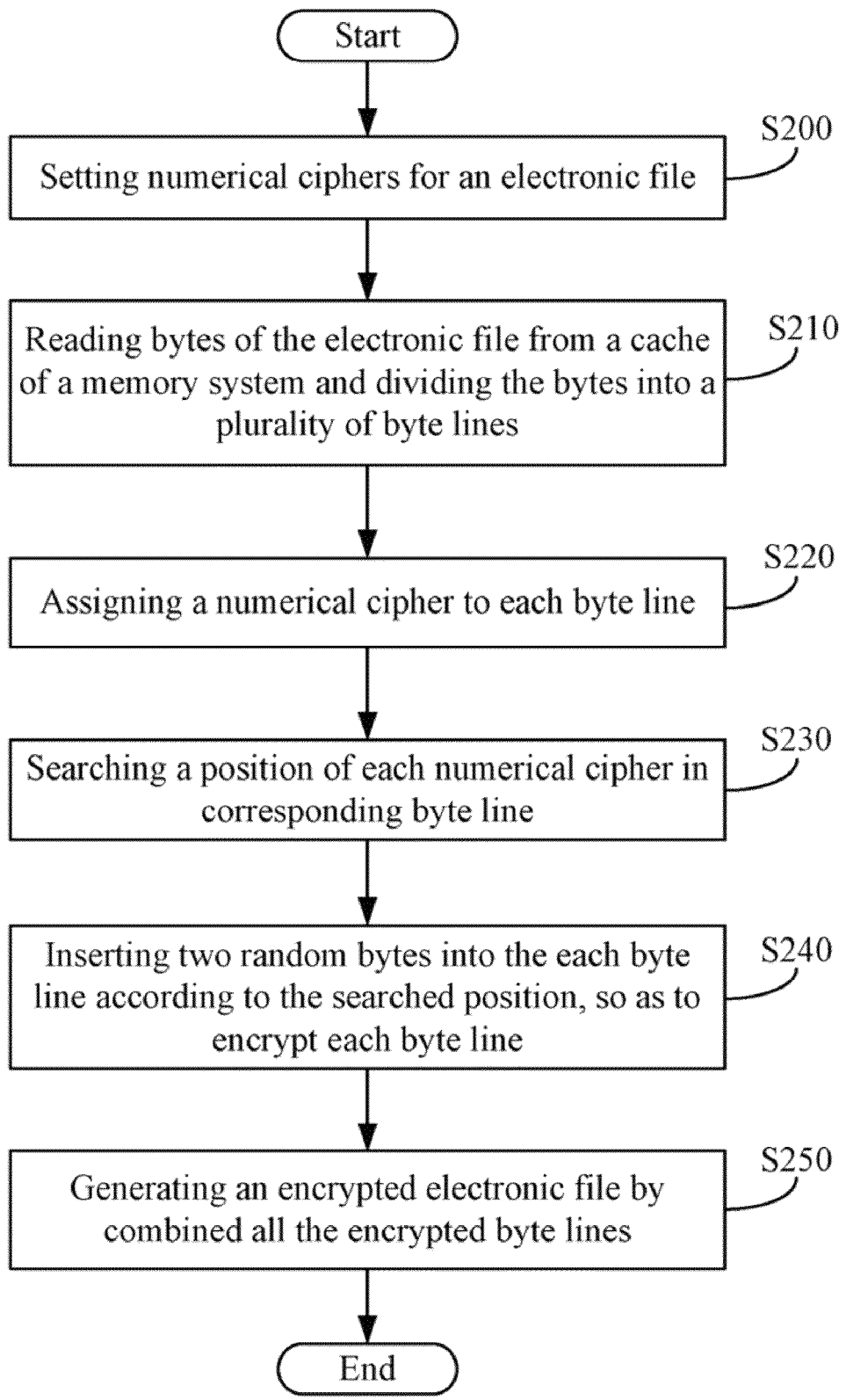
FIG. 2 is a flowchart of one embodiment of a method for encrypting an electronic file in the mobile electronic device.

FIG. 2 is a flowchart of one embodiment of a method for encrypting an electronic file in the mobile electronic device 1. Depending on the embodiment, additional blocks may be added, while others deleted, and the blocks may also be executed in a different order than described.

In block S200, the setting module 110 sets numerical ciphers for the electronic file. As mentioned above, each numerical cipher is a number, for example, the user may set numerical ciphers "650218" for the electronic file.

In block S210, the reading module 111 reads bytes of the electronic file from the cache of the memory system 12 and divides the bytes into a plurality of byte lines. As shown in FIG. 4, the reading module 111 divides the bytes of the electronic file into a plurality of byte lines. Each byte line comprises one or more bytes. For example, each byte line comprises ten bytes.

In block S220, the assigning module 112 assigns a numerical cipher to each byte line in a cyclical manner.

In block S230, the searching module 113 searches a position of each numerical cipher in a corresponding byte line.

In block S240, the inserting module 114 inserts one or more random bytes into each byte line according to the searched position, so as to encrypt each byte line. As mentioned above, a detailed description is as follows (the following description uses first byte line for example). In one embodiment, as shown in FIG. 5, the inserting module 114 two random bytes "12" and "34" into the first byte line after the byte "1A" to encrypt the first byte line, then the first byte line comprises twelve bytes.

In block S250, the generating module 115 combines all the encrypted byte lines, to generate an encrypted electronic file. In one embodiment, as shown in FIG. 5, the encrypted electronic file is generated by combining all the encrypted byte lines.

Figure 3:
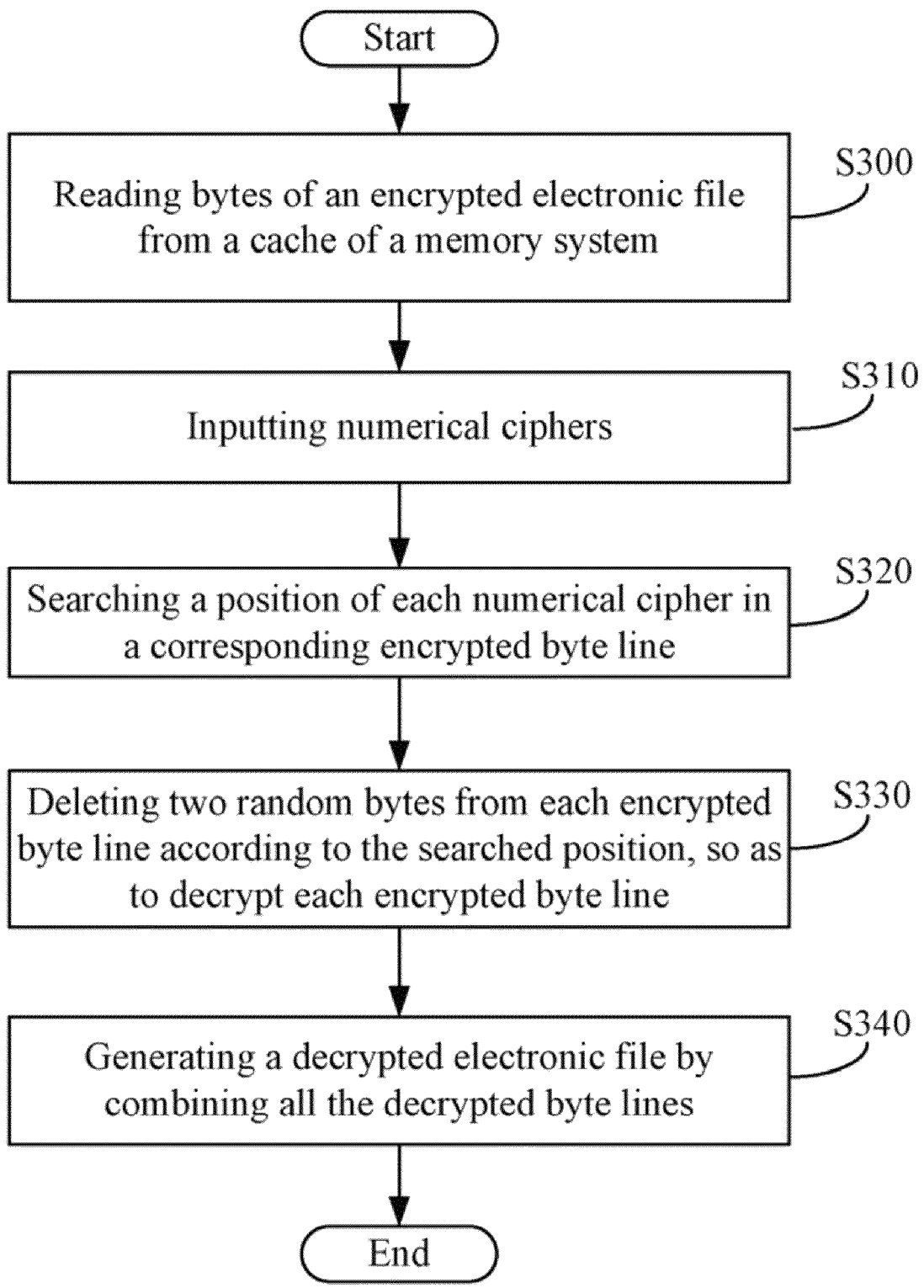
FIG. 3 is a flowchart of one embodiment of a method for decrypting an encrypted electronic file in the mobile electronic device.

FIG. 3 is a flowchart of one embodiment of a method for decrypting an encrypted electronic file in the mobile electronic device 1. The process of decrypting an encrypted electronic file refers to the reverse process of encryption.

In block S300, the mobile electronic device 1 reads bytes of an encrypted electronic file from the cache of the memory system 12.

In block S310, the mobile electronic device 1 receives numerical ciphers input by a user. In one embodiment, the user inputs numerical ciphers "650218" for the encrypted electronic file.

In block S320, the mobile electronic device 1 searches a position of each numerical cipher in a corresponding encrypted byte line. In one embodiment, as shown in FIG. 6, the numerical cipher corresponding to the first byte line is "6," then the position of numerical cipher in first byte line is "6," for example.

In block S330, the mobile electronic device 1 deletes one or more random bytes from each encrypted byte line according to the position, so as to decrypt each encrypted byte line. As mentioned above, a detailed description is as follows (the following description uses first byte line for example). In one embodiment, as shown in FIG. 6, the mobile electronic device 1 deletes two random bytes "12" and "34" from the first byte line after the byte "1A" to decrypt the first byte line, then the first byte line comprises ten bytes.

In block S340, the mobile electronic device 1 generates a decrypted electronic file by combining all the decrypted byte lines. In one embodiment, if the user inputs the numerical cipher "650218," the mobile electronic device 1 displays an original electronic file before encryption on a display device of the mobile electronic device. Otherwise, the mobile electronic device 1 does not display the original electronic file.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A mobile electronic device comprising a memory system storing a plurality of programs and a processor that executes one or more operations for the plurality of programs, the programs comprising:

a setting module operable to set user-defined numerical ciphers for an electronic file;

a reading module operable to read bytes of the electronic file from a cache of the memory system and divide the bytes into a plurality of byte lines, wherein each byte line comprises one or more bytes;

an assigning module operable to assign a numerical cipher to each byte line, wherein the numerical ciphers are assigned to consecutive byte lines of the electronic file repetitiously;

a searching module operable to search a position of each numerical cipher in a corresponding byte line according to the each numerical cipher;

an inserting module operable to insert one or more random bytes into each byte line according to the searched position, so as to encrypt each byte line; and a generating module operable to generate an encrypted electronic file by combining all the encrypted byte lines.

2. The mobile electronic device of claim 1, wherein the random bytes are generated by a random function.

3. The mobile electronic device of claim 1, wherein the electronic file is selected from the group consisting of a text file, an image file, and a multimedia file.

4. The mobile electronic device of claim 1, wherein the mobile electronic device is selected from the group consisting of a mobile phone, a personal digital assistant (PDA), a handheld game player, and a digital camera.

5. The mobile electronic device of claim 1, wherein the memory system is selected from the group consisting of a smart media card (SMC), a secure digital card (SDC), a compact flash card (CFC), a multi media card (MMC), a memory system stick (MS), an extreme digital card (XDC), and a trans flash card (TFC).

6. A method for encrypting an electronic file in a mobile electronic device, the method comprising:

setting user-defined numerical ciphers for the electronic file;

reading bytes of the electronic file from a cache of a memory system and dividing the bytes into a plurality of byte lines, wherein each byte line comprises one or more bytes;

assigning a numerical cipher to each byte line, wherein the numerical ciphers are assigned to consecutive byte lines of the electronic file repetitiously;

searching a position of each numerical cipher in a corresponding byte line according to the each numerical cipher;

inserting one or more random bytes into each byte line according to the searched position, so as to encrypt each byte line; and generating an encrypted electronic file by combining all the encrypted byte lines.

7. The method of claim 6, further comprising a decryption block, the decryption block comprising:

reading bytes of an encrypted electronic file from the memory system;

inputting numerical ciphers;

searching a position of each numerical cipher in a corresponding encrypted byte line;

deleting one or more random bytes from each encrypted byte line according to the position, so as to decrypt each encrypted byte line; and generating a decrypted electronic file by combining all the decrypted byte lines.

8. The method of claim 6, wherein the random bytes are generated by a random function.

9. The method of claim 6, wherein the electronic file is selected from the group consisting of a text file, an image file, and a multimedia file.

10. The method of claim 6, wherein the mobile electronic device is selected from the group consisting of a mobile phone, a personal digital assistant (PDA), a handheld game player, and a digital camera.

11. The method of claim 6, wherein the memory system is selected from the group consisting of a smart media card (SMC), a secure digital card (SDC), a compact flash card (CFC), a multi media card (MMC), a memory system stick (MS), an extreme digital card (XDC), and a trans flash card (TFC).

12. A non-transitory storage medium having stored thereon instructions that, when executed by a mobile electronic device, causes the mobile electronic device to perform a method for encrypting an electronic file, the method comprising:
   setting user-defined numerical ciphers for the electronic file;
   reading bytes of the electronic file from a cache of a memory system and dividing the bytes into a plurality of byte lines, wherein each byte line comprises one or more bytes;
   assigning a numerical cipher to each byte line, wherein the numerical ciphers are assigned to consecutive byte lines of the electronic file repetitiously;
   searching a position of each numerical cipher in a corresponding byte line according to the each numerical cipher;
   inserting one or more random bytes into each byte line according to the searched position, so as to encrypt each byte line; and
   generating an encrypted electronic file by combining all the encrypted byte lines.

13. The non-transitory storage medium of claim 12, wherein the method further comprises a decryption block, the decryption block comprising:
   reading bytes of an encrypted electronic file from the memory system;
   inputting numerical ciphers;
   searching a position of each numerical cipher in corresponding encrypted byte line;
   deleting one or more random bytes from each encrypted byte line according to the position, so as to decrypt each encrypted byte line; and
   generating a decrypted electronic file by combining all the decrypted byte lines.

14. The non-transitory storage medium of claim 12, wherein the random bytes are generated by a random function.

15. The non-transitory storage medium of claim 12, wherein the electronic file is selected from the group consisting of a text file, an image file, and a multimedia file.

16. The non-transitory storage medium of claim 12, wherein the mobile electronic device is selected from the group consisting of a mobile phone, a personal digital assistant (PDA), a handheld game player, and a digital camera.

17. The non-transitory storage medium of claim 12, wherein the memory system is selected from the group consisting of a smart media card (SMC), a secure digital card (SDC), a compact flash card (CFC), a multi media card (MMC), a memory system stick (MS), an extreme digital card (XDC), and a trans flash card (TFC).

* * * * *